(12) United States Patent
Nousiainen

(10) Patent No.: US 6,700,638 B1
(45) Date of Patent: Mar. 2, 2004

(54) TEMPERATURE STABILIZER FOR LIQUID CRYSTAL DISPLAYS (LCD)

(75) Inventor: Jaakko Nousiainen, Marttila (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/494,229

(22) Filed: Jan. 31, 2000

(51) Int. Cl.⁷ .............................................. G02F 1/1333
(52) U.S. Cl. ..................................... 349/161; 345/102
(58) Field of Search ................. 349/161, 162, 349/59, 60, 61; 345/102; 429/34

(56) References Cited

U.S. PATENT DOCUMENTS 6,275,211 B1 * 8/2001 Flannery ..................... 345/102
6,326,097 B1 * 12/2001 Hockaday ..................... 427/115

FOREIGN PATENT DOCUMENTS

| DE | 19526350 | | 1/1997 | |
|---|---|---|---|---|
| EP | 0302189 | | 2/1989 | |
| JP | 10308484 | | 11/1998 | |
| WO | WO-96/23399 | * | 8/1996 | ............ H05K/7/20 |
| WO | WO0002083 | | 1/2000 | |

\* cited by examiner

Primary Examiner—Robert H. Kim
Assistant Examiner—P. R. Akkapeddi
(74) Attorney, Agent, or Firm—Ware, Fressola, Van der Sluys & Adolphson LLP

(57) ABSTRACT

A liquid crystal display (LCD) is positioned with respect to electronic circuit components within a device so as to direct at least a part of thermal energy generated by and radiated from the electrical circuit components to the liquid crystal display.

22 Claims, 1 Drawing Sheet

TEMPERATURE STABILIZER FOR LIQUID CRYSTAL DISPLAYS (LCD)

TECHNICAL FIELD OF INVENTION

This invention relates to liquid crystal displays (LCD), and more particularly, to temperature stabilization of LCDs. More specifically, the present invention deals with temperature stabilization of an LCD of the type used in devices such as cellular telephones.

BACKGROUND OF THE INVENTION

Liquid crystal displays (LCD) are commonly used in a number of diverse products to show the operational status of the product to a user of the product. These products may typically be hand-held, battery operated devices such as personal digital assistants, scanners and cellular telephones. The performance of LCDs in these products deteriorate when the product is used in low ambient temperatures such that the display of alphanumeric characters and graphics becomes slower as the ambient temperature decreases.

The deterioration of LCD performance in low ambient temperatures is particularly troublesome to both cellular telephone users and cellular telephone performance. A particularly troublesome aspect encountered by a cellular telephone user is the slow response of the LCD as the user attempts to access the cellular telephone features or process a cellular communication using a cellular telephone that has been exposed to subzero or low ambient temperatures. Slow response of the LCD in a cellular telephone is not acceptable and due to battery power consumption constraints, it is not possible to use battery power to warm the LCD sufficiently to assure reliable performance in low ambient temperatures.

A further troublesome aspect is the additional battery power that is consumed as the cellular telephone user waits for the LCD display to become operational thus leading to a shorter battery life. Cellular telephones are marketed as "state of the art" communication devices and must maintain functionality in all typical user environments, particularly out-of-doors if these devices are to maintain their marketing images as advanced "state of the art" products.

A further problem which is manifested by unreliable or poor performance of a product is due to excessive heat developed by electrical components in the product. This excessive heat can cause expansion and contraction which effects the electrical and/or mechanical connection of the component to the printed circuit board. The excessive heat can also degrade the performance and reliability of the component itself which in turn results in less than acceptable product operation. Cellular telephones are susceptible to such reliability problems resulting from excessive heat developed by the phone circuitry and particularly excessive heat developed in the RF component section.

It is well known to those in the art that cellular telephone circuitry components, particularly RF components in the output stage generate and radiate excessive thermal energy or heat due to the components inefficiencies. Typically, the transmit efficiency in a GSM (global system for mobile communications) cellular telephone is in the range of 30 to 40 percent (%). For illustrative purposes to estimate the power dissipation converted to thermal energy, we will take that the maximum transmit power of a GSM cellular telephone is 2 Watts and the pulse duty cycle is ⅛. The average transmit power is then 0.25 Watts. The power dissipation converted into thermal energy is 2 times 0.25 Watts or 0.5 Watts. In reality the actual power dissipation is somewhat less due to pauses in speech and typically is in the range of 0.1 to 0.2 Watts. Two immediate benefits are achieved by leading the wasted or excess thermal energy away from the RF components. First, the operating temperature of the RF components will be lower thus making the RF components more stable, and second, by directing the wasted thermal energy through the LCD, its operational temperature will, in contrast to the RF components, be higher thus shortening the response time of the LCD.

Accordingly, it is an object of the present invention to provide a passive means and method for temperature stabilization for liquid crystal displays (LCD).

It is a further object of the present invention to dissipate excessive thermal energy or heat generated by electrical circuit components in a cellular telephone, particularly excessive heat generated in the RF component section to lower the operating temperature of the RF components.

It is yet a further object of the present invention to direct the excessive heat generated by the RF components to warm the LCD to shorten its response time in low ambient temperatures.

DISCLOSURE OF THE INVENTION

According to the present invention, a temperature stabilizer for an LCD device absorbs excess thermal energy or heat from an electrical circuit component wherein a thermally conductive medium guides the absorbed heat for transfer to the surface of the LCD.

In an embodiment shown herein, an electromagnetic shielding enclosure covers the electrical circuit components and absorbs thermal energy or heat generated by and radiated from the electrical circuit component. An LCD device is positioned above the enclosure and the absorbed heat is transferred by air convection to warm the LCD.

In a further embodiment as shown herein, the electromagnetic shielding enclosure includes an integrally coupled thermally conductive guide member to conduct the absorbed heat to the LCD which may be positioned other than directly above the enclosure.

According to a further embodiment of the invention shown herein, the electromagnetic shielding enclosure covers the RF component section in a cellular telephone to absorb the excess thermal energy or heat generated by and radiated from the RF component resulting in the RF component operating at a lower temperature. The absorbed heat is conducted along a thermally conductive guide member to warm the LCD which may be in physical contact with the guide member and positioned other than directly above the enclosure.

BRIEF DESCRIPTION OF THE DRAWINGS

These and other objects, features and advantages of the present invention will become more apparent in light of the following detailed description of embodiments thereof and illustrated in the accompanying drawings wherein.

DETAILED DESCRIPTION OF PREFERRED EMBODIMENTS

Figure 1:
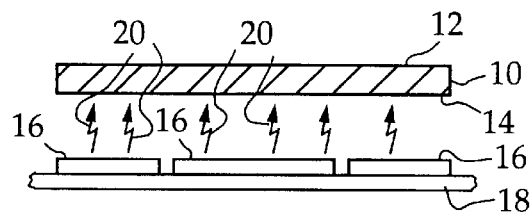
FIG. 1 is a somewhat diagrammatic cutaway profile view of an LCD device positioned to receive via air convection heat developed by and radiated from the electrical components mounted on a printed circuit board.

The various embodiments of the present invention will now be described with reference to the accompanying drawings in which like reference characters denote corresponding parts in several views.

Referring now to FIG. 1, a liquid crystal display (LCD) device 10 having a display surface 12 and a non-display surface 14 is shown therein. Electrical components 16, 16 are mounted on a printed circuit board (PCB) 18. If the design of the product is such that the LCD 10 can be positioned in close proximity to the electrical components 16, 16, or vice versa, so that at least part of the thermal energy or heat generated by the components is carried via radiation or air convection as represented by the arrows 20, 20 from the electrical components 16, 16 to the non-display surface 14 of the LCD 10.

Figure 2:
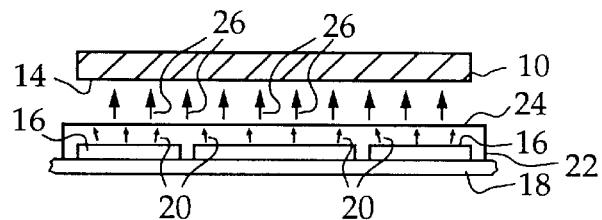
FIG. 2 is a somewhat diagrammatic cutaway profile view of an LCD device positioned to receive via air convection heat absorbed by an electromagnetic shielding enclosure covering the electronic components.

In many products, particularly cellular telephones, the electrical components 16, 16 are radio frequency (RF) components used in the transmission of the wireless signal. The RF components are typically covered by an electromagnetic shielding enclosure 22 as shown in FIG. 2 to prevent spurious signals from radiating from the product and interfering with other electronic devices. The electromagnetic shielding enclosure 22 has an upper surface 24 which in addition to preventing the RF signals from radiating from the product, absorbs thermal energy or heat generated by the RF components which thermal energy or heat is conducted from the RF components 16, 16 to the electromagnetic shielding enclosure 22 as shown by the arrows 20, 20. Again, as described above in connection with FIG. 1, if the product is designed such that the LCD 10 can be positioned in close proximity to the upper surface 24 of the electromagnetic shielding enclosure 22 absorbed thermal energy or heat shown by the arrows 26, 26 is conducted via air convection from the enclosure 22 to the non-display surface 14 of the LCD 10.

Figure 3:
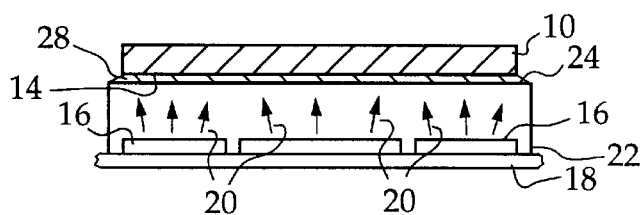
FIG. 3 is a somewhat diagrammatic cutaway profile view of an LCD device having its non-display surface positioned in physical contact with the outer surface of the electromagnetic shielding enclosure shown in FIG. 2.

Since air is not a very good thermally conductive medium, more efficient thermal energy transfer will be accomplished by positioning the LCD 10 in physical contact with the electromagnetic shielding enclosure 22 as illustrated in FIG. 3. Preferably, a thermally conductive paste layer 28 is deposited between the non-display surface 14 of the LCD 10 and the surface 24 of the electromagnetic shielding enclosure 22. The thermally conductive paste layer 28 enhances the thermal energy transfer to the LCD 10 and may be silicon or contain thermally conductive flakes carried therein to enhance the thermal energy transfer. Although the embodiment illustrated in FIG. 3 produces the intended result, the restrictions relative to placement and location of the LCD device 10 in the product is restrictive and limits the product design.

Figure 4:
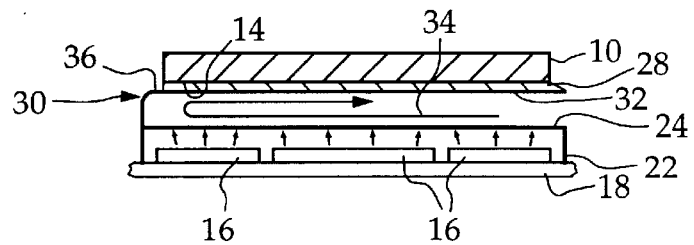
FIG. 4 is a somewhat diagrammatic cutaway profile view of an LCD device having its non-display surface positioned in physical contact with the surface of a thermally conductive guide member located over and integrally coupled to the electromagnetic shielding enclosure shown in FIG. 2.

The design limitations inherent in the embodiment illustrated in FIG. 3 are overcome with the embodiment as illustrated in FIG. 4. In FIG. 4, the electromagnetic shielding enclosure 22 includes an integrally coupled thermally conductive guide 30 having an axially extending leg portion 32 spaced from and substantially parallel to the upper surface 24 of the enclosure 22. Thermal energy or heat absorbed by the enclosure 22 is conducted along the enclosure to the integrally coupled thermally conductive leg portion 32 in the direction as represented by the arrow 34. In this manner, the thermal energy or heat is directed away from the enclosure 22 to the leg portion 32. A thermally conductive paste layer 28 is placed between the non-display surface 14 of the LCD 10 and the upper surface 36 of the leg portion 32 to enhance the transfer of thermal energy or heat to the LCD.

The thermally conductive guide member 30 may be fashioned as one piece as part of the electromagnetic shielding enclosure 22 or may be stamped of a semi-rigid metallic material and fastened to the enclosure 22 so that the absorbed heat is directed and guided from the enclosure 22 to the leg portion 32. The thermally conductive guide member 30 may be a stamped metal, metal foil or other semi-rigid, thermally conductive material known in the art. Preferably, the thermally conductive guide member is somewhat flexible to compensate for manufacturing tolerances and to accommodate positioning of the LCD 10 during the assembly of the product.

Figure 5:
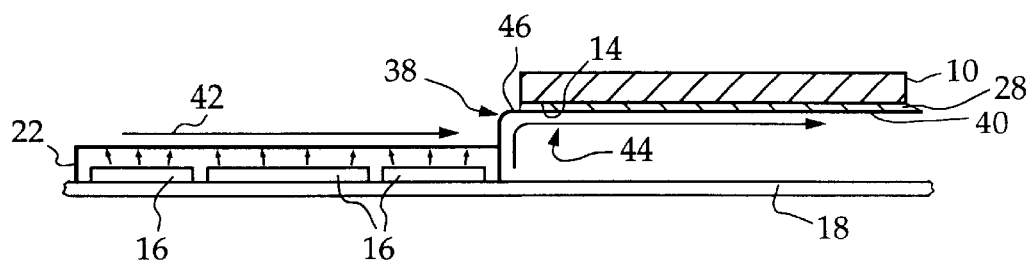
FIG. 5 is a somewhat diagrammatic cutaway profile view of an LCD device having its non-display surface positioned in physical contact with the surface of a thermally conductive guide member integrally coupled to but located away from the electromagnetic shielding enclosure shown in FIG. 2.

A further embodiment of the present invention is illustrated in FIG. 5 to allow flexibility and versatility in the design of the product by permitting the LCD 10 to be placed other than directly over the surface of the electromagnetic shielding enclosure 22. As illustrated in FIG. 5, a thermally conductive guide member 38 is integrally coupled to the electromagnetic shielding enclosure 22 and defines an axially elongated extension leg member 40 which is spaced from and substantially parallel to the surface of the printed circuit board 18. Although illustrated substantially parallel to the printed circuit board 18, the thermally conductive guide member 38 and the extension leg member 40 may be positioned in different orientations to accommodate the product design. Thermal energy or heat absorbed by the enclosure 22 is directed along a path defined by the surface portion of the enclosure 22 in the direction represented by the arrow 42 towards the integrally coupled thermally conductive guide member 38. The guide member 38 in turn guides the thermal energy or heat along a path defined by the surface 46 of the guide member 38 in a direction as illustrated by the arrow 44. As described above, a thermally conductive paste layer 28 is placed between the lower surface 14 of the LCD 10 and on the surface 46 of the leg member 40 of the thermally conductive guide member 38 to enhance the transfer of thermal energy or heat to the LCD.

A temperature stabilizer for a liquid crystal display (LCD) has been described above in several embodiments. It will be understood that the numerous modifications and substitutions may be made without departing from the spirit and scope of the invention. Therefore, the invention has been described by way of illustration rather than limitation.

What is claimed is:

1. An LCD temperature stabilizing method comprising the steps of:

absorbing excess heat from an electrical circuit component;

guiding said absorbed heat along a thermally conductive medium, and transferring said absorbed heat from said thermally conductive medium to the surface of the LCD.

2. An LCD temperature stabilizing method as set forth in claim 1, further including absorbing excess heat from an RF component.

3. An LCD temperature stabilizing method as set forth in claim 1, further including the step of providing an electromagnetic shielding enclosure covering the electrical circuit component.

4. An LCD temperature stabilizing method as set forth in claim 1, further including the step of positioning the LCD surface in physical contact with said thermally conductive medium.

5. An LCD temperature stabilizing method as set forth in claim 4, further including the step of providing a thermally conductive paste layer between the LCD surface and the thermally conductive medium.

6. An LCD temperature stabilizing method as set forth in claim 3, further including the step of providing a thermally conductive guide member integrally coupled to said electromagnetic shielding enclosure.

7. An LCD temperature stabilizing method as set forth in claim 6, further including the step of positioning the LCD surface in physical contact with said thermally conductive guide member.

8. An LCD temperature stabilizing method as set forth in claim 7, further including the step of providing a thermally conductive paste layer between the LCD surface and said thermally conductive guide member.

9. An LCD temperature stabilizing method as set forth in claim 6, further including the step of providing a thermally conductive guide member made of a semi-rigid material.

10. An LCD temperature stabilizing method as set forth in claim 6, further including the step of providing a thermally conductive guide member made of a flexible thermally conductive material.

11. An LCD temperature stabilizing method as set forth in claim 6, further including the step of providing a metal foil thermally conductive guide member.

12. An LCD temperature stabilizer, comprising:
   means for absorbing thermal energy dissipated by an electrical circuit component;
   thermally conductive guide means integrally coupled to said thermal energy absorbing means for directing said absorbed thermal energy along a predefined path to the LCD, and
   means for transferring said absorbed thermal energy from said thermally conductive guide means to the LCD.

13. The LCD temperature stabilizer as defined in claim 12, wherein said means for absorbing thermal energy further comprises an electromagnetic shielding enclosure.

14. The LCD temperature stabilizer as defined in claim 12, wherein said electrical circuit component is an RF component.

15. The LCD temperature stabilizer as defined in claim 13, wherein said electromagnetic shielding enclosure further comprises an electromagnetic shielding enclosure of the type used in a cellular telephone to prevent spurious signals from being radiated from an RF component in the cellular telephone circuitry.

16. The LCD temperature stabilizer as defined in claim 13, further comprising said thermally conductive guide member integrally coupled to said electromagnetic shielding enclosure.

17. The LCD temperature stabilizer as defined in claim 12, further comprising means for positioning the LCD in contact with a surface of said thermally conductive guide member for transferring said absorbed thermal energy to the LCD.

18. The LCD temperature stabilizer as defined in claim 12, further comprising said electrical circuit component comprising at least one electrical circuit component that generates excess heat.

19. The LCD temperature stabilizer as defined in claim 12, further comprising means for positioning the LCD in a spaced relation to a surface of said thermally conductive guide member, whereby at least a portion of said thermal energy dissipated by said electrical circuit component is directed to the LCD.

20. The LCD temperature stabilizer as defined in claim 16, wherein said thermally conductive guide member directs said absorbed thermal energy along a predefined path away from said electromagnetic shielding enclosure to the LCD.

21. The LCD temperature stabilizer as defined in claim 19, further comprising means for positioning the LCD in a spaced relation to said thermally conductive guide member in a location not over said thermally conductive guide member.

22. The LCD temperature stabilizer as defined in claim 17, further including a thermally conductive paste layer between the LCD and the surface of the thermally conductive guide member.

* * * * *